United States Patent Office 3,555,007
Patented Jan. 12, 1971

3,555,007
7-DEOXY-7-HALO LINCOMYCIN
D DERIVATIVES
Barney J. Magerlein, Portage, Mich., assignor to The
Upjohn Company, Kalamazoo, Mich., a corporation of
Delaware
No Drawing. Filed July 22, 1968, Ser. No. 746,281
Int. Cl. C07c 47/18
U.S. Cl. 260—210                                    7 Claims

ABSTRACT OF THE DISCLOSURE

Antibacterial compound, $\Delta^{4',\alpha}$-1-demethyl-7-halo-7-deoxylincomycins of the formula

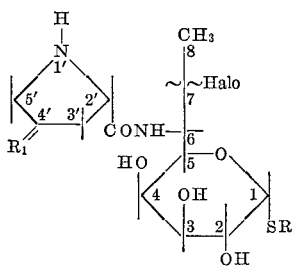

I are obtained by acid methanolysis of 1'-(carbo-t-butoxy) I which in turn is obtained by N-acylating an alkyl 7-halo-7-deoxy-α-thiolincosaminide with 1-(carbo-t-butoxy)-4-alkylidene-L-2-pyrrolidinecarboxylic acid which in turn is obtained by N-acylation of 4-alkylidene-L-2-pyrrolidinecarboxylic acid, which in turn is obtained by acid hydrolysis of N-carbobenzoxy-4-alkylidene-L-2-pyrrolidinecarboxylic acid.

BRIEF SUMMARY OF INVENTION

The invention relates to novel compounds having antibacterial activity and useful for the same purposes as lincomycin and to processes for the preparation of the same, and is particularly directed to $\Delta^{4',\alpha}$-1'-demethyl-7-halo-7-deoxylincomycins of Formula I and to their preparation. Unless otherwise specified, Halo as used herein refers to chlorine, bromine, and iodine; R to alkyl of not more than 12 carbon atoms; and $R_1$ to alkylidene of not more than 20 carbon atoms; cycloalkylidene of 3 to not more than 8 carbon atoms; or aralkylidene of not more than 12 carbon atoms. Advantageously R is methyl or ethyl and $R_1$ contains not more than 8 carbon atoms. Any or all of the 2-, 3-, and 4-hydroxy groups can be esterified or etherified.

Examples of alkyl of not more than 12 carbon atoms are methyl, ethyl, propyl, butyl, pentyl, hexyl, heptyl, octyl, nonyl, decyl, undecyl, dodecyl, and the isomeric forms thereof. Examples of alkylidene cycloalkylidene, and aralkylidene groups include methylene, ethylidene, propylidene, butylidene, pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and α-nathphylmethylene.

The novel compounds of the invention are prepared by acylating an alkyl 7-halo-7-deoxy-α-thiolincosaminide of the formula:

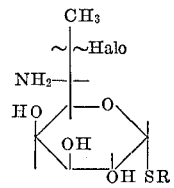

II with a 1-acylated-4-alkylidene-L-2-pyrrolidinecarboxylic acid of the formula:

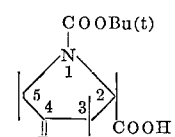

III and subjecting the thus formed alkyl N-(1'-(carbo-t-butoxy)-4'-alkylidene-L - 2' - pyrrolidinecarbonyl)-7-deoxy-7-halo-α-thiolincosaminide of the formula:

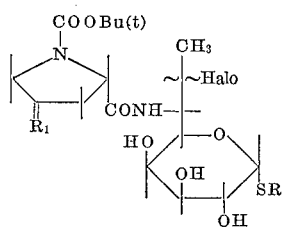

IV to selective solvolysis to cleave the carbo-t-butoxy group without cleaving the amide linkage.

DETAILED DESCRIPTION

The acylation step can be effected with any suitable acylation procedures well known in the art. A suitable such process is to react the 1-(carbo-t-butoxy)-4-alkylidene-L-2-pyrrolidenecarboxylic acid with isobutyl chloroformate in a suitable solvent, for example, acetonitrile, in the presence of an acid binding agent, for example, triethylamine, and reacting the alkyl 7-halo-7-deoxy-α-thiolincosaminide with the mixed anhydride thus formed.

The isobutyl chloroformate advantageously is added to a cooled solution of the acid and acid binding agent and the amino sugar then added. Advantageously a temperature of about 5° C. is maintained throughout the reaction but higher or lower temperatures, say from about −20 to about 25° C. can be used. The alkyl N-(1'-(carbo-t-butoxy) - 4' - alkylidene-L - 2' - pyrrolidinecarbonyl)-7-halo - 7 - deoxy-α-thiolincosaminide (Formula IV) thus formed can be isolated in the usual manner. It is not necessary, however, that it be obtained in a pure form. It is desirable, however, to remove the bulk of the other reaction products and materials, for example, by evaporation to dryness and extraction of the residue with a solvent for the akyl N-(1'-(carbo-t-butoxy) - 4' - alkylidene-L-2'-pyrrolidinecarbonyl) - 7 - halo - 7 - deoxy-α-thiolincosaminide, for example, methylene chloride.

The selective solvolysis step is advantageously accomplished by acid methanolysis. Thus, by subjecting the alkyl N-(1'-(carbo-t-butoxy) - 4' - alkylidene-L-2-pyrrolidinecarbonyl) - 7 - halo - 7 - deoxy-α-thiolincosaminide to the acid catalyzed solvolytic action of methanol the carbo-t-butoxy group is cleaved with little or no cleavage of the amide linkage. The acid methanolysis can be effected simply by dissolving the alkyl N-(1'-carbo-t-butoxy) - 4' - alkylidene-L-2'-pyrrolidinecarbonyl)-7-halo-7-deoxy-α-thiolincosaminide in methanol which is acidified with hydrochloric acid. If desired, gentle heating, for example, on a steam bath, can be used to accelerate the cleavage. The alkyl N-(4'-alkylidene-L-2'-pyrrolidinecarbonyl)-7-halo - 7 - deoxy-α-thiolincosaminide (Formula I) can be isolated in the usual manner suitable by solvent extractions and crystallization.

It is sometimes desirable to start the process with 1-carbobenzoxy - 4 - alkylidene-L-2-pyrrolidinecarboxylic as this material is readily available from 1-carbobenzoxy-4-oxo-L-2-pyrrolidinecarboxylic acid by the procedures described in U.S. Pat. 3,380,992.

The 1-carbobenzoxy group is cleaved by acid cleavage so that the $\Delta^{4}\cdot\alpha$-unsaturation is preserved and the resulting 4 - alkylidene-L-2-pyrrolidinecarboxylic acid is N-acylated with an N-carbo-t-butoxylating agent to 1-(carbo-t-butoxy) - 4-alkylidene-L-2-pyrrolidinecarboxylic acid (Formula III).

The acid cleavage can be effected advantageously by dissolving the 1 - carbobenzoxy-4-alkylidene-2-pyrrolidinecarboxylic acid in 30% hydrogen bromide-acetic (glacial acetic acid substantially saturated with hydrogen bromide). The cleavage takes place at room temperature (25° C.). The 4 - alkylidene-L - 2 - pyrrolidinecarboxylic acid thus liberated can be separated by the usual method such as solvent extraction and crystallization.

Acylation of the 4-alkylidene-L-2-pyrrolidinecarboxylic acid thus formed with tertiary-butoxy-carbonic acid can be effected with any suitable acylating agent. Advantageously t-butoxy-carbonylazide is used. The reaction can be effected in 50% aqueous dioxane, or like solvent, advantageously in the presence of a weak base such as magnesium oxide. The reaction proceeds at room temperature (25° C.) but mild heating up to about 60° C. can be used if desired. The 1 - (carbo-t-butoxy)-4-alkylidene-L-2 - pyrrolidinecarboxylic acid thus obtained can be isolated by the usual procedures. It is not necessary to the process, however, that it be recovered in a pure state as the subsequent steps can be performed on a crude product. Ordinarily, it will be sufficient to remove the bulk of the extraneous material by extraction in a solvent such as ethyl acetate and evaporation of the solvent.

Any or all of the 2-, 3-, and 4-hydroxy groups can be esterified either in the starting compounds (Formula V), in the intermediates (Formula VI), or in the final products (Formula I), for example, with hydrocarbon carboxylic acids, advantageously of not more than 18 carbon atoms, or halo-, nitro-, hydroxy-, amino-, cyano-, thiocyano-, or alkoxy substituted hydrocarbon carboxylic acids, advantageously also of not more than 18 carbon atoms.

Examples of carboxylic acid acyl radicals are the acyl radicals of the following acids: (a) saturated or unsaturated, straight or branched chain aliphatic carboxylic acids, for example acetic, propionic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic, acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, the the like; (c) saturated or unsaturated, alicyclic aliphatic carboxylic acids, for example, cyclopentaneacetic acid, cyclopentanepropionic acid, cyclohexaneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboxylic acids are mono-, di-, and trichloroacetic acid; α- and β-chloropropionic acid; α- and γ-bromobutyric acid; α- and β-iodovaleric acid; mevalonic acid; 2- and 4-chlorocyclohexanecarboxylic acid; shikimic acid; 2-nitro-1-methylcyclobutanecarboxylic acid; 1,2,3,4,5,6 - hexachlorohexanecarboxylic acid; 3-bromo-2-methylcyclohexanecarboxylic acid; 4- and 5-bromo - 2 - methylcyclohexanecarboxylic acid; 5- and 6-bromo - 2 - methylcyclohexanecarboxylic acid; 2,3-dibromo - 2 - methylcyclohexanecarboxylic acid; 2,5-dibromo - 2 - methylcyclohexanecarboxylic acid; 4,5-dibromo - 2 - methylcyclohexanecarboxylic acid; 5,6-dibromo - 2 - methylcyclohexanecarboxylic acid; 3-bromo-3-methylcyclohexanecarboxylic acid; 6-bromo-3-methylcyclohexanecarboxylic acid; 1,6 - dibromo-3-methylcyclohexanecarboxylic acid; 2-bromo - 4 - methylcyclohexanecarboxylic acid; 1,2 - dibromo - 4 - methylcyclohexanecarboxylic acid; 3-bromo - 2,3,3 - trimethylcyclopentanecarboxylic acid; 1-bromo - 3,5 - dimethylcyclohexanecarboxylic acid; homogentisic acid, o-, m-, and p-chlorobenzoic acid; anisic acid; salicylic acid; p-hydroxybenzoic acid; β-resorcyclic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid and lactic acid. Examples of such alkoxyhydrocarbon carboxylic acids are ethoxyformic acid (ethyl hydrogen carbonate); butyloxyformic acid; pentyloxyformic acid; hexyloxyformic acid; dodecyloxyformic acid; hexadecyloxyformic acid, and the like.

Any or all of the 2-, 3-, and 4-hydroxy groups can also be etherified, for example, with alkyl, advantageously of not more than 20 carbon atoms; cycloalkyl, advantageously of from 3 to not more than 12 carbon atoms; or ylidene (e.g., 3,4-O-ylidene) group for example alkylidene, advantageously of not more than 20 carbon atoms and aramethylidene and vinylogs thereof, advantageously of not more than 12 carbon atoms. Examples of alkylidene are given above and examples of aralkylidene are furfurylidene, 5 - methylfurfurylidene, benzylidene, m-tolylidene, o-tolylidene, p-tolylidene, o-chlorobenzylidene, m-chlorobenzylidene, m - bromobenzylidene, p-bromobenzylidene, p-methoxybenzylidene, m-methoxybenzylidene, o-methoxybenzylidene, 3,4-dimethoxybenzylidene, salicylidene, p-hydroxybenzylidene, 3,4,5-trimethoxybenzylidene, piperonylidene, o-nitrobenzylidene, p-chlorobenzylidene, m - nitrobenzylidene, p-nitrobenzylidene, β-naphthylidene, p - bromobenzylidene, 2,4 - dichlorobenzylidene, 3 - methoxy - 4-hydroxybenzylidene, terephthylidene, 3,4-dihydroxybenzylidene, and cinnamylidene.

The compounds of the invention (Formula I) exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, pricric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The free bases can be used as a buffer or as an antacid. The compounds of Formula I also react with isocyanates to form urethanes and can be used to modify polyurethane resins. The long chain compounds, i.e., where $R_1$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Pats. 2,425,320 and 2,606,155. The free bases also make good vehicles for toxic acids. For example, the fluosilicic acid addition salts are useful as mothproofing agents according to U.S. Pats. 1,915,334 and 2,075,359 and the hexafluoroarsenic acid and hexafluorophosphoric acid addition salts are useful as parasiticides according to U.S. Pats. 3,122,536 and 3,122,552.

Methyl N-(4'-propylidene-L-2'-pyrrolidinecarbonyl)-7-halo-7-deoxy-α-thiolincosaminide and its close analogues, i.e., where $R_1$ contains not more than 8 carbon atoms and R is methyl or ethyl, have antibacterial properties similar to lincomycin and can be used for the same purposes as lincomycin. The other analogues and isomers also show antibacterial properties and can likewise be used to treat infections in animals due to gram positive organisms.

The following examples are illustrative of the process and products of the present invention but are not to be construed as limiting. The parts and percentages are by weight and the solvent ratios are by volume unless otherwise specified.

EXAMPLE 1

(A) 4-propylidene-L-2-pyrrolidinecarboxylic acid

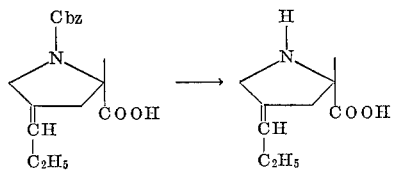

A quantity of 18.9 g. of 1-carbobenzoxy-4-propylidene-L-2-pyrrolidinecarboxylic acids dissolved in 59 ml. of 30% hydrogen bromide-acetic acid. After 35 min. the reaction mixture is diluted with 1400 ml. of anhydrous ether. After standing for 3 hrs. the ether is decanted and 1 liter of fresh ether added. After stirring for 3 hrs. 12.3 g. of 4-propylidene-L-2-pyrrolidinecarboxylic acid hydrobromide is recovered by filtration. This product is dissolved in 30 ml. of water and passed over a column of 135 g. of cage resin. There is recovered 7.7 g. of 4-propylidene-L-2-pyrrolidinecarboxylic acid by lyophilization of the effluent. This material is crystallized from methanol-ethyl acetate to give 3.0 g. of 4-propylidene-L-2-pyrrolidinecarboxylic acid, M.P. 202–208° C.

A portion on recrystallization from the same solvent affords an analytical sample, M.P. 220–228° C. dec., [α] −51° ($H_2O$).

Analysis.—Calcd. for $C_8H_{13}NO_2$ (percent): C, 61.91; H, 8.44; N, 9.03. Found (percent): C, 61.78; H, 8.67; N, 8.96.

Cage resins are ion retardation resins obtained by polymerizing acrylic acid is strongly basic quaternary ammonium cross-linked polystyrene anion exchange resin. Kirk-Othner, Encyclopedia of Chemical Technology, vol. 11, p. 876, 2nd ed., for example Retardation 11 and A8 and Bio-Rad A6–1 resins.

(B) 1-(carbo-t-butoxy)-4-propylidene-L-2-pyrrolidinecarboxylic acid

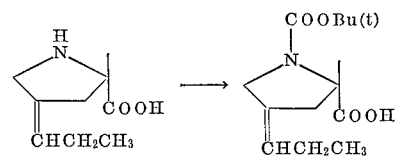

A mixture of 4.0 g. of 4-propylidene-L-2-pyrrolidinecarboxylic acid, 2.07 g. of MgO and 7.37 g. of t-butoxycarbonylazide in 100 ml. of 50% aq. dioxane is stirred at ambient temperature for 96 hrs. The mixture is diluted with 150 ml. of water and then extracted three times with ethyl acetate. The cooled aqueous solution is acidified to pH 5 by the addition of 10% citric acid solution. On extraction with three portions of ethyl acetate followed by drying and evaporation of the solution 3.6 g. (54.9%) of crude 1-(carbo-t-butoxy)-4-propylidene-L-2-pyrrolidinecarboxylic acid is obtained as an oily residue. This material is used directly in the next step.

(C) Methyl 7-deoxy-7(S)-chloro-α-thiolincosaminide

C–1: To a suspension of 197.2 g. of triphenylphosphine in 1.5 l. of anhydrous acetonitrile is added 52.5 g. of chlorine. With stirring, 18.75 g. of methyl α-thiolincosaminide (U.S. Pat. 3,179,565) is added. After 2.5 hrs. at ambient temperature, 50 ml. of methanol is added. The mixture is concentrated to a thick syrup. The concentrate is diluted with methylene chloride and extracted three times with water. The aqueous extracts are washed twice with methylene chloride. The extracts are made alkaline with sodium hydroxide and extracted repeatedly with methylene chloride. The organic extract is dried and evaporated under vacuum. The residue is chromatographed over 1.1 kg. of silica gel using chloroform-methanol (4:1) for elution. The major fraction selected on the basis of its TLC (thin layer chromatography) profile weighs 4.4 g. Recrystallization from methanol-water affords 2.73 g. of methyl 7(S)-chloro-7-deoxy-α-thiolincosaminide, M.P. 178–181°.

Analysis.—Calcd. for $C_9H_{18}ClNO_4S$ (percent): C, 39.77; H, 6.67; N, 5.16; S, 11.80; Cl, 13.05. Found (percent): C, 39.91; H, 7.02; N, 5.57; S, 11.99; Cl, 13.33.

C–2: A mixture of 1.0 g. of methyl α-thiolincosaminide, 3.0 g. of triphenylphosphine, 10 ml. of carbon tetrachloride, and 100 ml. of acetonitrile is heated at reflux for 3 hrs. The reaction mixture is evaporated to dryness under vacuum and the residue purified by chromatography over 500 g. of silica gel using a solvent system composed of chloroform and methanol (4:1). The product fractions (as determined by TLC) are collected, combined, and evaporated to a white solid. On recrystallization from ethanol, there is obtained 250 mg. (23.3%) of crystals of methyl 7(S)-chloro-7-deoxy-α-thiolincosaminide, M.P. 169–172° C. having an I.R. identical with the product of Part C–1.

(D) Methyl N-(1'-(carbo-t-butoxy)-4'-propylidene-L-2'-pyrrolidinecarbonyl)-7-deoxy-7(S) - chloro-α-thiolinosaminide

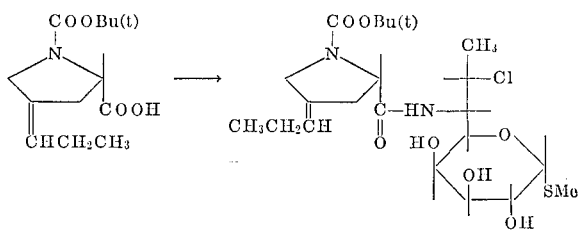

To a solution of 3.6 g. of 1-(carbo-t-butoxy)-4-propylidene-L-2-pyrrolidinecarboxylic acid and 1.96 ml. of triethylamine in 90 ml. of acetonitrile cooled to 5° is added 1.8 ml. of i-butyl chloroformate. After 30 min. a solution of 3.82 g. of methyl 7(S)-chloro-7-deoxy-α-thiolincosaminide in 40 ml. of water and 40 ml. of acetone is added. After stirring for 4 hrs., the acetonitrile is distilled under vacuum and the product recovered by extraction with methylene chloride. After drying and evaporation of the solvent methyl N-(1'-(carbo-t-butoxy)-4'-propylidene-L-2'-pyrrolidinecarbonyl)-7(S)-chloro-7-deoxy-α-thiolincosaminide is obtained as a glassy residue which is used in the next step.

(E) $\Delta^{4',\alpha}$-1'-demethyl-7(S)-chloro-7-deoxylincomycin hydrochloride

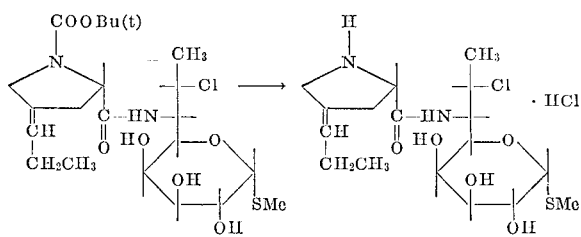

A solution of 9.8 g. of methyl N-(1'-(carbo-t-butoxy)-4' - propylidene-L-2'-pyrrolidinecarbonyl) - 7(S) - chloro-7-deoxy-α-thiolincosaminide in 25 ml. of methanol and 20 ml. $H_2O$ is acidified with 1.8 ml. of 6 N hydrochloric acid and warmed for 1 hr. on the steam bath. The methanol is distilled in vacuo and the aqueous solution extracted with methylene chloride. The aqueous extract is acidified with 6 N HCl and extracted 3 times with 25 ml. portions of $MeCl_2$. The combined extract is dried and evaporated to give a residue of 2.336 g. This is warmed with 10 ml. of acetone which precipitates 300 mg. of product as the free base. M.P. 165–171°. The acetone soluble filtrate is acidified with 6 N HCl. Crystalline hydrochloride salt, M.P. 177–185° dec., and weighing 1.4 g. precipitates.

This solid is crystallized from 15 ml. of acetonitrile and 5 ml. of methanol to yield 1.15 g. of $\Delta^{4',\alpha}$-1'-demethyl-7(S)-chloro-7-deoxylincomycin hydrochloride, M.P. 175–185° dec.

*Analysis.*—Calcd. for $C_{17}H_{29}N_2O_5SCl \cdot HCl$ (percent): C, 45.84; H, 6.79; N, 6.29; S, 7.20; Cl, 15.92. Found (percent): C, 45.42; H, 7.08; N, 6.05; S, 7.09; Cl, 15.77.

(Corrected for 4.16% $H_2O$ determined by Karl Fischer analysis.)

By substituting the 1-carbobenzoxy-4-propylidene-L-2-pyrrolidinecarboxylic acid of Example 1 by 1-carbobenzoxy-4-butylidene-L-2-pyrrolidinecarboxylic acid,
1-carbobenzoxy-4-pentylidene-L-2-pyrrolidinecarboxylic acid,
1-carbobenzoxy-4-hexylidene-L-2-pyrrolidinecarboxylic acid,
1-carbobenzoxy-4-octylidene-L-2-pyrrolidinecarboxylic acid,
1-carbobenzoxy-4-cyclohexylidene-L-2-pyrrolidinecarboxylic acid, and
1-carbobenzoxy-4-benzylidene-L-2-pyrrolidinecarboxylic acid there are obtained
4-butylidene-L-2-pyrrolidinecarboxylic acid,
4-pentylidene-L-2-pyrrolidinecarboxylic acid,
4-hexylidene-L-2-pyrrolidinecarboxylic acid,
4-octylidene-L-2-pyrrolidinecarboxylic acid,
4-cyclohexylidene-L-2-pyrrolidinecarboxylic acid, and
4-benzylidene-L-2-pyrrolidinecarboxylic acid;
1-(carbo-t-butoxy)-4-butylidene-L-2-pyrrolidinecarboxylic acid,
1-(carbo-t-butoxy)-4-pentylidene-L-2-pyrrolidinecarboxylic acid,
1-(carbo-t-butoxy)-4-hexylidene-L-2-pyrrolidinecarboxylic acid,
1-(carbo-t-butoxy)-4-octylidene-L-2-pyrrolidinecarboxylic acid,
1-(carbo-t-butoxy)-4-cyclohexylidene-L-2-pyrrolidinecarboxylic acid, and
1-(carbo-t-butoxy)-4-benzylidene-L-2-pyrrolidinecarboxylic acid;
methyl N-(1'-(carbo-t-butoxy)-4'-butylidene-L-2-pyrrolidinecarbonyl)-7(S)-chloro-7-deoxy-α-thiolincosaminide,
methyl N-(1'-(carbo-t-butoxy)-4'-pentylidene-L-2'-pyrrolidinecarbonyl)-7(S)-chloro-7-deoxy-α-thiolincosaminide,
methyl N-(1'-(carbo-t-butoxy)-4'-hexylidene-L-2'-pyrrolidinecarbonyl)-7(S)-chloro-7-deoxy-α-thiolincosaminide,
methyl N-(1'-(carbo-t-butoxy)-4'-octylidene-L-2'-pyrrolidinecarbonyl)-7(S)-chloro-7-deoxy-α-thiolincosaminide,
methyl N-(1'-(carbo-t-butoxy)-4'-cyclohexylidene-L-2'-pyrrolidinecarbonyl)-7(S)-chloro-7-deoxy-α-thiolincosaminide, and
methyl N-(1'-(carbo-t-butoxy)-4'-benzylidene-L-2'-pyrrolidinecarbonyl)-7(S)-chloro-7-deoxy-α-thiolincosaminide;
methyl N-(4'-butylidene-L-2'-pyrrolidinecarbonyl)-7(S)-chloro-7-deoxy-α-thiolincosaminide,
methyl N-(4'-pentylidene-L-2'-pyrrolidinecarbonyl)-7(S)-chloro-7-deoxy-α-thiolincosaminide,
methyl N-(4'-hexylidene-L-2'-pyrrolidinecarbonyl)-7(S)-chloro-7-deoxy-α-thiolincosaminide,
methyl N-(4'-octylidene-L-2'-pyrrolidinecarbonyl)-7(S)-chloro-7-deoxy-α-thiolincosaminide,
methyl-N-(4'-cyclohexylidene-L-2'-pyrrolidinecarbonyl-7(S)-chloro-7-deoxy-α-thiolincosaminide, and
methyl N-(4'-benzylidene-L-2'-pyrrolidinecarbonyl)-7(S)-chloro-7-deoxy-α-thiolincosaminide.

By substituting the chlorine in Part C–1 by bromine the corresponding 7(S)-bromo-7-deoxy compounds are obtained. By substituting the carbon tetrachloride of Part C–2 by carbon tetraiodide, the corresponding 7(S)-iodo-7-deoxy compounds are obtained.

By substituting the methyl α-thiolincosaminide of Part C by ethyl and higher alkyl α-thiolincosaminides (U.S. Pat. 3,380,992) there are obtained the corresponding ethyl and higher alkyl N-(4'-alkylidene-L-2'-pyrrolidinecarbonyl) - 7(S) - halo - 7 - deoxy-α-thiolincosaminides and the corresponding ethyl and higher alkyl N-(1'-(carbo-t-butoxy) - 4' - alkylidene - L - 2'-pyrrolidinecarbonyl-7-(S)-7-deoxy-α-thiolincosaminides.

By substituting the methyl α-thiolincosaminide of Part C by methyl and higher alkyl 7-epi-α-thiolincosaminides (U.S. Pat. 3,380,992) there are obtained the corresponding methyl and higher alkyl N-(4'-alkylidene-L-2'-pyrrolidinecarbonyl) - 7(R) - halo - 7 - deoxy-α-thiolincosaminides and the corresponding N-(1'-(carbo-t-butoxy)-4'-alkylidene - L - 2' - pyrrolidinecarbonyl)-7(R)-halo-7-deoxy-α-thiolincosaminides.

I claim:
1. A compound of the formula

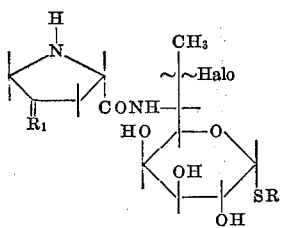

where Halo is chlorine, bromine, or iodine; R is alkyl of not more than 12 carbon atoms; and $R_1$ is alkylidene of not more than 20 carbon atoms, cycloalkylidene of 3 to not more than 8 carbon atoms, and aralkylidene of not more than 12 carbon atoms; and the acid addition salts thereof.

2. A compound according to claim 1 in which $R_1$ contains not more than 8 carbon atoms and R is methyl or ethyl.

3. A compound according to claim 2 in which Halo is chlorine.

4. A compound according to claim 2 in which Halo is 7(S)-chloro.

5. A compound of claim 4 in which $R_1$ is propylidene.

6. A process which comprises subjecting 1-carbobenzoxy-4-alkylidene-L-2-pyrrolidinecarboxylic acid to acid cleavage to form 4-alkylidene-L-2-pyrrolidenecarboxylic acid, N-acylating the acid thus formed with a carbo-t-butoxy acylating agent to form 1-carbo-t-butoxy-4-alkylidene-L-2-pyrrolidinecarboxylic acid, acylating with the acid thus formed an alkyl 7-halo-7-deoxy-α-thiolincosaminide to form N - (1'-(barbo-t-butoxy-4'-alkylidene-L-2'-pyrrolidinecarbonyl-7-halo-7-deoxy-α-thiolincosaminide.

7. A process according to claim 6 in which the N-(1'-(carbo-t-butoxy) - 4' - alkylidene - L - 2' - pyrrolidinecarbonyl-7-halo-7-deoxy-α-thiolincosaminide is subjected to acid methanolysis to form N-(4'-alkylidene-L-2'-pyrrolidinecarbonyl-7-halo-7-deoxy-α-thiolincosaminide.

References Cited
UNITED STATES PATENTS 3,418,414   12/1968   Houtman _____ 260—210
3,435,025   3/1969    Birkenmeyer _____ 260—210

ELBERT L. ROBERTS, Primary Examiner

J. R. BROWN, Assistant Examiner

U.S. Cl. X.R.

252—357; 260—2.5, 999